June 10, 1952      G. H. LA MARQUE      2,599,647
METHOD OF MAKING SIMULATED FLOWERS Filed May 20, 1950      2 SHEETS—SHEET 1

INVENTOR.
George H. LaMarque.
BY
Heard Smith Tennant
Attorneys

June 10, 1952  G. H. LA MARQUE  2,599,647
METHOD OF MAKING SIMULATED FLOWERS

Filed May 20, 1950  2 SHEETS—SHEET 2

INVENTOR.
George H. LaMarque.
BY
Heard Smith & Tennant
attorneys.

Patented June 10, 1952

2,599,647

UNITED STATES PATENT OFFICE 2,599,647

METHOD OF MAKING SIMULATED FLOWERS

George H. La Marque, Boston, Mass.

Application May 20, 1950, Serial No. 163,290

1 Claim. (Cl. 41—13)

This invention relates to the art of making artificial or simulated flowers, and especially to the art of making such articles from a vegetable of the tuber variety, such, for instance, as a potato, or a vegetable of the root variety such, for instance, as a turnip or a carrot.

One feature of the invention concerns a novel method of cutting or fashioning a simulated flower from a vegetable of the tuber or root variety such as above referred to, and another feature of the invention concerns the treatment of the fashioned simulated flower to provide it with the desired color and to preserve it so that it will retain its original pristine beauty for long periods of time.

While any suitable vegetable of the tuber or root variety may be used in carrying out my invention, yet I prefer to use potatoes for this purpose, partly because the flesh or body of the potato is white and can be readily dyed to different colors, and partly because a potato can be satisfactorily treated with a preservative after it has been fashioned into a simulated flower and has been dyed.

In order to give an understanding of the invention I have illustrated in the drawings the various steps involved in fashioning a flower from a tuber or a root.

Figure 1:
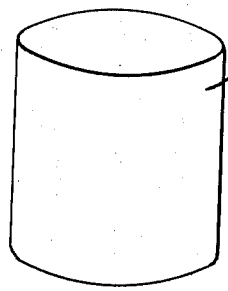
Figure 1 illustrates a portion of a tuber cut to a cylindrical form which represents the base or blank from which the final simulated flower is fashioned.

In carrying out my invention I first form from a tuber, such as a potato, or a root, such as a turnip or carrot, etc., a cylindrical member 1, such as illustrated in Fig. 1, said member having a diameter approximating the diameter of the simulated flower ultimately to be fashioned therefrom. The blank or base element 1 is preferably cut from the body of the tuber or root so that all the skin will have been removed.

The next step is to cut a plurality of pieces from one end of the blank 1 so as to form a plurality of flat surfaces 2, each of which is sector-shaped, and all of which meet at the center 3. The number of flat faces 2 thus formed on the end of the blank 1 may be varied dependent somewhat on the character of the simulated flower to be fashioned and for illustrative purposes the blank 1 is shown in Fig. 2 having three such flat faces 2 formed thereon.

This gives the end of the blank 1 a sort of pyramidal shape with rather flat, as distinguished from steep sides. Said end of the blank, which is shown at the top in Fig. 2, ultimately will form the bottom of the flower which is fashioned from the blank.

Figure 2:
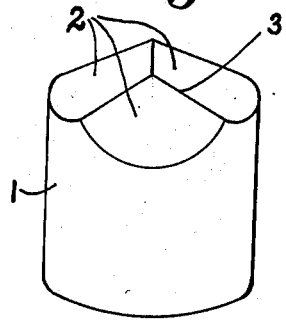
Figs. 2 to 9 show various steps in the shaping of the blank shown in Fig. 1, into the final flower-like article.

After one end of the blank 1 has been given the shape shown in Fig. 2, then incisions 4 are made in the blank, one for each flat face 2, each incision being parallel to but spaced slightly from the corresponding face 2. These incisions 4 extend inwardly and downwardly from the side wall of the blank, as best seen in Fig. 4, and they extend only partway through the body of the blank as also indicated in Fig. 4 and each has the same circumferential dimension as the corresponding flat face 2.

Figure 3:
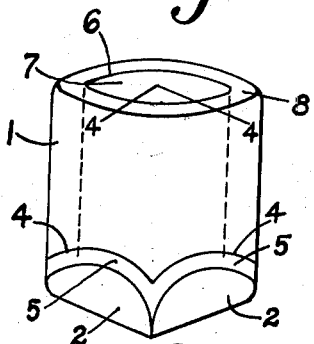

In Fig. 3 the blank 1 is shown as inverted from the position shown in Fig. 2 so that the faces 2 thereof are at the bottom and the incisions 4 are cut into the side walls of the blank above the faces 2. The portions 5 of the blank between the incisions 4 and the faces 2 ultimately form the lower petals of the simulated flower and if the blank is formed with three inclined end faces 2 then there will be three such petal elements 5 formed.

Figure 4:
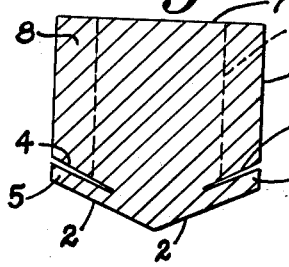

After the incisions 4 have been thus formed then a circular incision 6 is made in the upper end of the blank 1, as indicated in Figs. 3 and 4, which circular incision extends from the upper face 7 of the blank down to the incisions 4, and the portion 8 of the blank outside of the circular or cylindrical incision 6 is removed thereby leaving a stump portion 9. In forming the incision 6 it will be convenient to cut into the side wall of the body 1 along the line 10 and then to carry the knife, or other slitting implement, around the circular line 6 to sever the outer portion 8 from the remaining stump portion 9 of the body.

Figure 5:
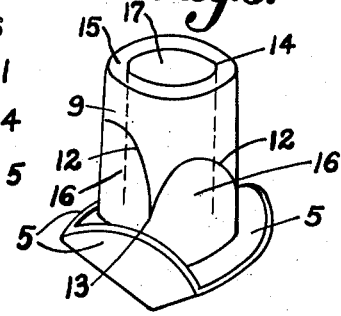
Figure 6:
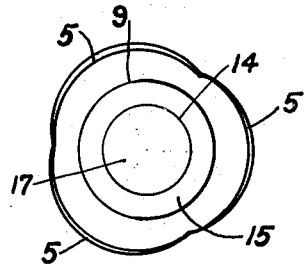

After the portion 8 has been thus removed, thereby leaving the stump portion 9, a second series of inwardly and downwardly inclined slits or incisions 12 are made in the side of the stump portion 9, each incision inclining inwardly and downwardly and extending only partway through the stump portion. These incisions are so made that the adjacent incisions meet at a point, as indicated at 13, each incision having an arcuate shape, as shown in Fig. 5.

These incisions 12 are equal in number to the incisions 4 and have staggered relation thereto.

Figure 7:
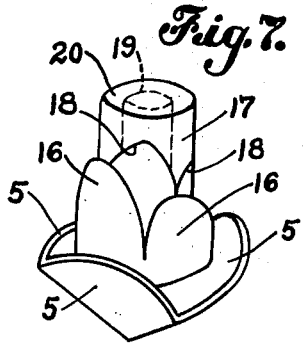
Figure 8:
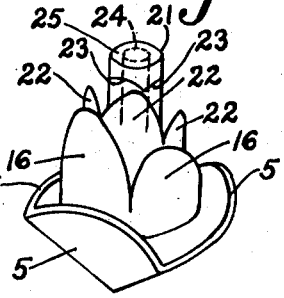
Figure 10:
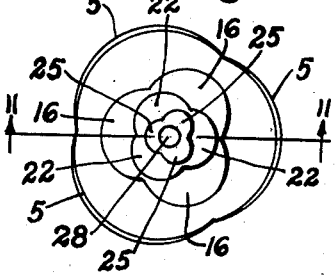
Fig. 10 is a top plan view of a simulated flower embodying my invention.
Figure 9:
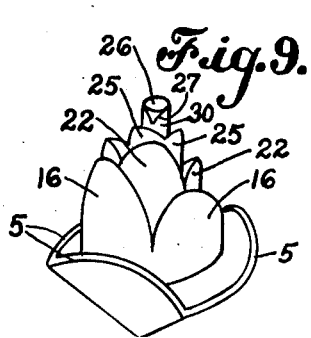
Figure 11:
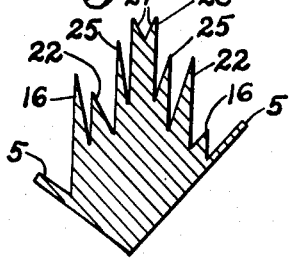
Fig. 11 is a section on line 11—11 Fig. 10.

After the incisions 12 have been made in the stump portion 9, then a circular incision is made in the stump portion which is substantially parallel to the periphery of said stump portion and which extend from the end of the stump down to meet the incisions 12. Such circular incision is indicated by the line 14 in Fig. 5 and after making this incision then the exterior portion 15 of the stump member 9 is removed, thereby leaving a second series of petal elements 16 formed by the slits 12 and a smaller and shorter stump portion 17 as indicated in Fig. 7.

This shorter and smaller stump portion 17 is then treated in the same manner that the stump portion 9 was treated, that is, a plurality of inwardly and downwardly inclined slits 18 are formed in said shorter and smaller stump portion 17, said slits 18 corresponding in number to the slits 12 and 4, but being staggered with relation to the slits 12. Subsequently a circular incision is made in the stump portion 17 from the end downward to meet the incisions 18, said circular incision being indicated at 19 in Fig. 7. The formation of this incision 19 separates the exterior portion 20 of the stump 17 from the inner part thereof and said exterior portion is then removed. This results in the formation of a still smaller and shorter stump portion 21 and also provides a third series of petal members 22 which are inside the petal members 16, but have a staggered relation thereto.

The still smaller and shorter stump portion 21 is then treated in the same manner as the stump portions 17 and 9 were treated, that is, by forming therein inwardly and downwardly inclined incisions 23 equal in number to the incisions 18 and 12, but staggered with relation to the incisions 18. Thereafter a circular incision is made in the still smaller stump 21, which is indicated by the line 24, and which extends from the end downwardly to meet the incisions 23. This incision 24 serves to separate the outer wall portion 25 of the stump 21 from the core thereof and this outer wall portion is then removed leaving another stump portion 26 which is smaller and shorter than the stump portion 21.

These operations may be repeated until the stump portion which is produced is too small for further treatment and thereafter the end of the very small stump portion may be provided with one or more slits or incisions 27, thereby to provide at the end of such stump portions small petal members 28.

The article thus produced simulates a flower and by varying the number of incisions in each series, and also by varying the inclinations thereof, it is possible to produce an article which simulates a wide variety of flowers.

After the article has thus been fashioned from the potato or other tuber, or from a root, then it is washed thoroughly and dyed to the desired color. In dyeing the article thus fashioned I find best results are obtained by using a dye material which is a combination of an oil soluble dye and water soluble dye. Furthermore, I preferably use a food dye, that is, a dye of the character commonly used for coloring food products. A coal tar dye of this type gives excellent results and for the vehicle in the oil soluble dye I may use either a vegetable oil, such as a soy bean oil, or an animal oil such as that obtained from lard or tallow.

The fashioned article is dyed to a desired color by submerging it in a dye bath and in preparing such a bath I prepare the oil soluble dye ingredient and the water soluble dye ingredient separately and then mix these two ingredients together to produce the final dye bath. A satisfactory oil soluble dye ingredient may be produced by dissolving one-half teaspoonful of the dye powder in two pounds of oil, the oil being heated to approximately 98° F. for this purpose.

For making the water soluble dye ingredient I find good results are obtained by using a teaspoonful of dye to a pint of water. The oil soluble dye ingredient and the water soluble dye ingredient are both heated to a temperature of approximately 98° F. and are then mixed together to produce the final dye solution used in the dye bath. The fashioned article to be dyed should be immersed in this dye bath for a suitable length of time and best results are obtained if the dye bath is heated to approximately 110° F. during such immersion. The time of immersion may vary somewhat according to the strength of the dye bath, but with the dye bath prepared as above described experience has shown that if the article is fashioned from a potato it will be sufficiently dyed if it is immersed in the bath for a period of five to ten minutes.

After the article has been thus dyed then it is removed from the dye bath and washed in warm water to remove surplus dye material and oil from the surface of the article. Usually rinsing the article in warm water for about three to five minutes will be sufficient for this purpose.

The article is then washed in cold water, that is, water having a temperature of approximately 35 to 40° F. The washing in cold water may continue for five minutes or so and is for the purpose of closing the pores of the article and stopping any bleeding operation.

The dyed and washed article is then dried for two or three hours and this can conveniently be accomplished by merely placing the article on a table and allowing it to dry naturally in the atmosphere although, of course, if atmospheric drying conditions are not suitable the article may be dried in some well known form of drying apparatus. The drying of the article finally closes the pores on the surface of the petals and serves to lock in the article the dye material. The use of the oil soluble ingredient in the dye material assists the penetration of the dye into the interior of the petal members of the article and also serves to give the surface of said petal members a pleasing appearance. Such oil soluble ingredient is also helpful in retarding any bleeding tendency of the petal members.

After the article has been dried then it is subjected to a preserving operation and for this purpose I find good results are obtained by submerging the article for a suitable period of time in a preservative solution containing sodium benzoate and vinegar. The sodium benzoate acts as a toughener as well as a preserver and it imports strength into the petal members of the flower so that they will not readily become damaged.

For making the preservative I use sodium benzoate and water in a proportion of about one teaspoonful of sodium benzoate to one pint of water and to this solution I add vinegar, preferably a white colorless vinegar, in proportion of approximately four quarts of vinegar to one pint of the water containing the sodium benzoate.

If the white vinegar used is what is known as a 4% acid vinegar, then the vinegar mixed with the water containing the sodium benzoate will reduce the acidity of the mixture to about a 3% acid content.

The article after having been dyed and rinsed and dried is submerged in this preservative liquid for twenty-four hours or so after which it is removed and rinsed in cold water.

Figure 12:
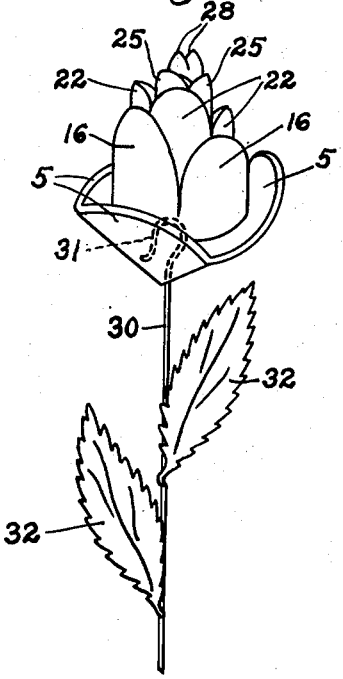
Fig. 12 illustrates the fashioned flower with a stem element attached.

It is then put into a second solution of the character above described, but having substantially equal quantities of the water containing sodium benzoate and the vinegar with the result that the second preservative solution has a lower acid content. The article is allowed to remain in this second preservative solution for twenty-four hours or so and then it is removed and rinsed in cold water. At this point the fashioned article may be provided with a stem and leaves. The stem may be made from the yarn covered wire commonly used by florists in making up floral displays, such a wire being indicated at 30 in Fig. 12. For attaching the wire to the article the end of the wire is bent into a hook form as indicated at 31 and by manipulating the hook it is entered into the body of the article, as shown in Fig. 12.

The stem 30 is preferably provided with leaves 32. These leaves may be natural leaves taken from any suitable growing shrub, but before they are secured to the stem 30 the leaves are painted to give them the desired color to mate up with the dyed simulated flower. As the painted leaves dry they will curl up more or less, but if when they are fully dry they may be steamed or soaked in warm water they will uncurl and flatten out and thereafter will retain their flat shape. These leaves are secured to the stem 30 in any usual way by winding fine wire around the stem of the leaf and the stem 30.

The simulated flower is thus completed ready for display and for such display I propose to place a bunch of simulated flowers in a sealed glass container containing the same preservative solution with which the fashioned flower was originally treated.

Figure 13:
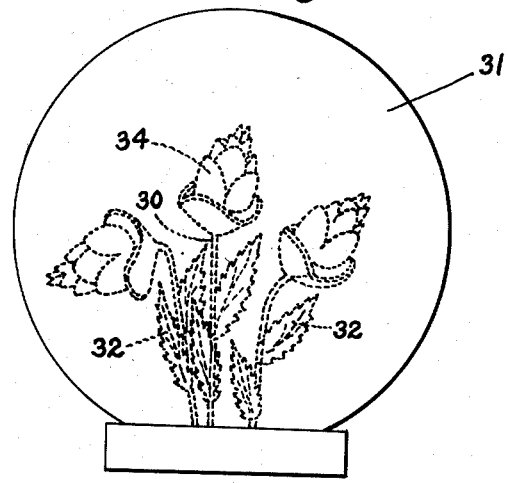
Fig. 13 illustrates a plurality of simulated flowers embodying my invention enclosed in a sealed glass bowl which is filled with suitable preservative liquid.

In Fig. 13 there is indicated a glass bowl 31 containing a bunch of flowers 34 made in accordance with the above invention, said bowl being filled with the preservative fluid and being properly sealed. This makes an attractive flower display which will not deteriorate and which will retain its original shape and color indefinitely.

I claim:

The process of making a simulated flower which comprises shaping a substantially cylindrical member from a tuber, shaping one end of the cylindrical member to give it a relatively flat pyramidal shape having sector shaped flat faces each of which extends at a slight angle to a radial line and from the periphery of the cylindrical member to a common central point, making in said cylindrical member adjacent said end thereof a series of incisions, one incision for each of said flat faces, each incision being substantially parallel to the corresponding sector shaped flat face and having the same circumferential dimension as said face but extending only part way through said member in a radial direction, the adjacent incisions merging together thereby forming a plurality of petal-like portions, making in said cylindrical member a circular incision substantially concentric therewith which extends from the other end thereof to and meets the first-named incisions, removing and discarding the material of said member outside said circular incision and above the inclined incisions, thereby making a stump portion extending beyond the petal-like portions, making in said stump portion near the base thereof a second series of inwardly and downwardly inclined incisions smaller in number than the first-named inwardly and downwardly inclined incisions, but in staggered relation thereto, each incision of the second series entering the stump portion at a point relatively near the base thereof and extending circumferentially through an angle substantially equal to that of the incisions of the first series, thereby forming a second series of petal-like portions within but smaller than the first-named petal-like portions, making in the end of the stump portion another circular incision which is substantially concentric therewith and which extends to the incision of the second series, removing from the stump portion and discarding the material thereof outside the circular incision formed therein, thereby leaving a second stump portion smaller and shorter than the first-named stump portion, and continuing such operations until the stump portion produced is too small to receive further incisions.

GEORGE H. LA MARQUE.

REFERENCES CITED

The following references are of record in the file of this patent:

UNITED STATES PATENTS

| Number | Name | Date |
| --- | --- | --- |
| 166,995 | Lee | Aug. 24, 1875 |
| 1,076,786 | Reinherz | Oct. 28, 1913 |
| 1,307,617 | Burrows | June 24, 1919 |
| 1,732,739 | Butcher | Oct. 22, 1929 |